(12) United States Patent
Chiou

(10) Patent No.: US 8,659,893 B2  
(45) Date of Patent: Feb. 25, 2014

(54) PROTECTION CASING OF ELECTRONIC DEVICE WITH FUNCTION OF SUPPORTING

(75) Inventor: Shih-Hsun Chiou, New Taipei Hsien (TW)

(73) Assignee: Triangus Co., Ltd, Taishan disc., New Taipei (TW)

( * ) Notice: Subject to any disclaimer, the term of this patent is extended or adjusted under 35 U.S.C. 154(b) by 84 days.

(21) Appl. No.: 13/412,630

(22) Filed: Mar. 6, 2012

(65) Prior Publication Data

US 2013/0235522 A1 Sep. 12, 2013

(51) Int. Cl.
*G06F 1/16* (2006.01)

(52) U.S. Cl.
USPC .............. 361/679.55; 361/679.3; 361/679.56; 206/45.2; 206/45.24; 312/223.1; 312/223.2

(58) Field of Classification Search
None
See application file for complete search history.

(56) References Cited

U.S. PATENT DOCUMENTS

| | | | | |
|---|---|---|---|---|
| 5,054,736 A * | 10/1991 | Champoux | ................... | 248/444 |
| 5,165,649 A * | 11/1992 | Neumann et al. | ............. | 248/459 |
| 7,318,521 B2 * | 1/2008 | Lau | ............................ | 206/45.24 |
| 8,132,670 B1 * | 3/2012 | Chen | .............................. | 206/320 |
| 8,235,208 B2 * | 8/2012 | Sirichai et al. | ................ | 206/320 |
| 8,281,924 B2 * | 10/2012 | Westrup | ........................ | 206/320 |
| 8,393,464 B2 * | 3/2013 | Yang et al. | .................... | 206/45.2 |
| D679,279 S * | 4/2013 | Yang et al. | .................... | D14/440 |
| 8,424,829 B2 * | 4/2013 | Lu et al. | ......................... | 248/371 |
| 8,424,830 B2 * | 4/2013 | Yang et al. | .................... | 248/459 |
| 2009/0159763 A1 * | 6/2009 | Kim | ................................ | 248/174 |
| 2010/0072334 A1 * | 3/2010 | Le Gette et al. | ........... | 248/176.3 |
| 2011/0285258 A1 * | 11/2011 | Yuan | .......................... | 312/223.2 |
| 2012/0138494 A1 * | 6/2012 | Thomas | ........................ | 206/320 |
| 2012/0181195 A1 * | 7/2012 | Lu et al. | ......................... | 206/320 |
| 2012/0325689 A1 * | 12/2012 | Wibby et al. | ................. | 206/45.2 |
| 2013/0020214 A1 * | 1/2013 | Chiou | ........................... | 206/320 |
| 2013/0026329 A1 * | 1/2013 | Lane et al. | .................... | 248/459 |
| 2013/0048514 A1 * | 2/2013 | Corcoran et al. | .......... | 206/45.23 |
| 2013/0098782 A1 * | 4/2013 | Diebel et al. | ................ | 206/45.25 |

* cited by examiner

*Primary Examiner* — Anthony Q Edwards

(57) ABSTRACT

A protection casing of an electronic device with a function of supporting includes a lower casing having an approximately rectangular shape; a periphery of the lower casing being formed with a frame for enclosing a tablet computer; a supporting sheet including at least one kind of foldable traces; the supporting sheet being foldable along the foldable traces so as to present a three dimensional structure; a combining band (201) formed at an upper side of the supporting sheet adhering the supporting sheet to the lower casing; and wherein after assembly the supporting sheet to the lower casing, the supporting sheet can be folded along the foldable traces to form as a seat for standing the lower casing; and an electronic device can be placed on the lower casing for supporting the casing thereon.

7 Claims, 8 Drawing Sheets

US 8,659,893 B2

PROTECTION CASING OF ELECTRONIC DEVICE WITH FUNCTION OF SUPPORTING

FIELD OF THE INVENTION

The present invention relates to supporters of flat electronic devices, and in particular to a protection casing of an electronic device with a function of supporting, which provides an lower casing being used as both a cover and a supporter so that a tablet computer placed thereon can be well protected and can be supported as any desired orientation.

BACKGROUND OF THE INVENTION

Tablet computers are a main trend in application of computers. The percentage of tablet computers over the computers is increased gradually. iPad Smart Cover is a kind of cover for protecting the screen of the iPad. The backside of the iPad is not covered by the iPad Smart Cover. However in many applications of the iPad, the tablet computer is needed to stand at a desired orientation for displaying. Generally, the user finds a supporter to support the tablet computer or take it at hand. However this is inconvenient for users. Although the Smart cover has the function of supporting an iPad to stand, the slopes of the iPad on the table are finite and the supporting function of the Smart cover is short and thus it is unsteadily.

Thus, there is an eager demand for a novel design which can resolve the prior art defects.

SUMMARY OF THE INVENTION

The present invention relates to a protection cover of an electronic device with a function of supporter, in that the present invention is not only used for supporting an electronic device. Thus, the user is not necessary to prepare another supporter. Therefore, the functions of the casing for tablet computer are enhanced and the user will feel convenient as he (or she) carries the computer.

To achieve above object, the present invention provides a protection casing of an electronic device with a function of supporting including a lower casing having an approximately rectangular shape; a periphery of the lower casing being formed with a frame for enclosing a tablet computer; a supporting sheet including at least one kind of foldable traces; the supporting sheet being foldable along the foldable traces so as to present a three dimensional structure; a combining band (201) formed at an upper side of the supporting sheet adhering the supporting sheet to the lower casing; and wherein after assembly the supporting sheet to the lower casing, the supporting sheet can be folded along the foldable traces to form as a seat for standing the lower casing; and an electronic device can be placed on the lower casing for supporting the casing thereon.

DETAILED DESCRIPTION OF THE INVENTION

Figure 1:
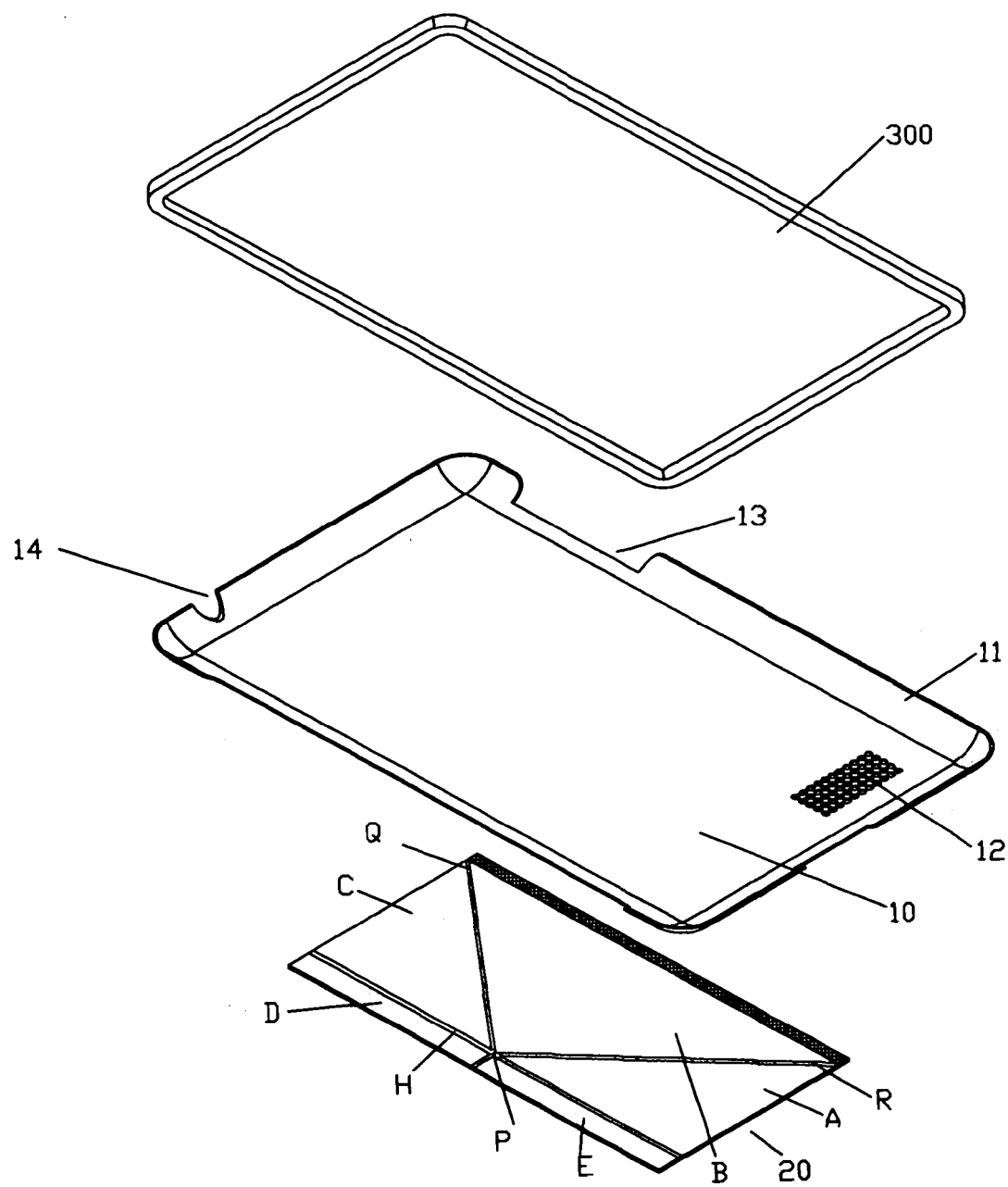
FIG. 1 is a perspective view of a first embodiment of the present invention.

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

The present invention is related to a casing of an electronic device with a function of supporter. In the present invention, the electronic device may be one of a tablet computer (such as ipads), computer displays, electronic game machines, personal digital assistants, etc. In the following description, the tablet computer is used as an example, but it is not used to confine the scope of the present invention. The first embodiment of the present invention will be described herein with reference to FIG. 1 to 3.

A lower casing 10 has an approximately rectangular shape. A periphery of the lower casing 10 is formed with a frame 11 for enclosing a tablet computer completely so as to isolate damages from external sources, powders, evaporations, and damage from collision. The lower casing 10 are formed with a plurality of holes, one hole 14 serves for exposing a USB slot, one hole 12 for sound transmission, and other holes 13 for heat dissipation and other functions.

A supporting sheet 20 includes at least one kind of foldable traces. The supporting sheet 20 is foldable along the foldable traces so as to present a three dimensional structure.

Figure 2:
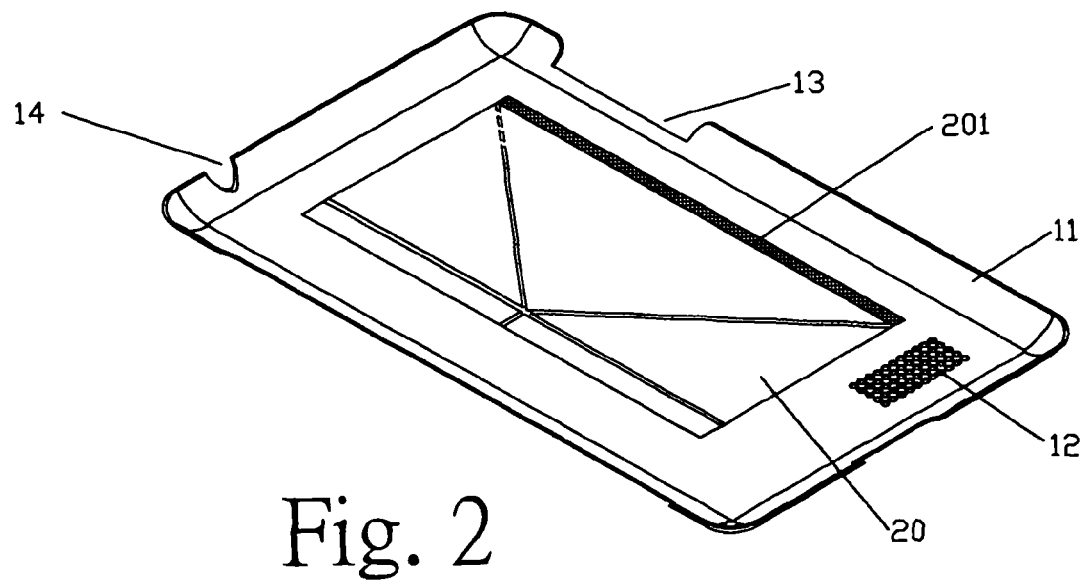
FIG. 2 is a schematic view about the combination of the lower casing and the supporting sheet.

A combining band 201 is formed at an upper side of the supporting sheet 20 for adhering the supporting sheet 20 to the lower casing 10 as illustrated in FIG. 2.

For the first kind of folding traces as illustrated in FIG. 1. A point P is located near a lower side of the supporting sheet 20 (see the aspect shown in FIG. 2). A foldable line H approximately parallel to the lower side of the supporting sheet 20 passes through the point P. Then two foldable lines Q and R extend from the point P to the two upper corners of the upper side of the supporting sheet 20 so that to divide the supporting sheet 20 into three triangular sections A, B and C. Another foldable lines S extend downwards from the point P to the lower side of the supporting sheet 20 so as to divide the lower portion of the supporting sheet 20 into two oblong sections D and E. These sections are connected flexibly so that the adjacent sections are foldable with respective to one another. The three triangular sections A, B and C include two approximately right triangles A and C clamping an approximately isosceles triangle B. The longest sides of the approximately right triangles A and C are adjacent to the approximately isosceles triangle B. A bottom side of each right triangle A and C is adjacent to a corresponding oblong sections D and E.

The areas between the different sections of the support plate 20 have weak structures so that they are folded to one another.

Figure 3:
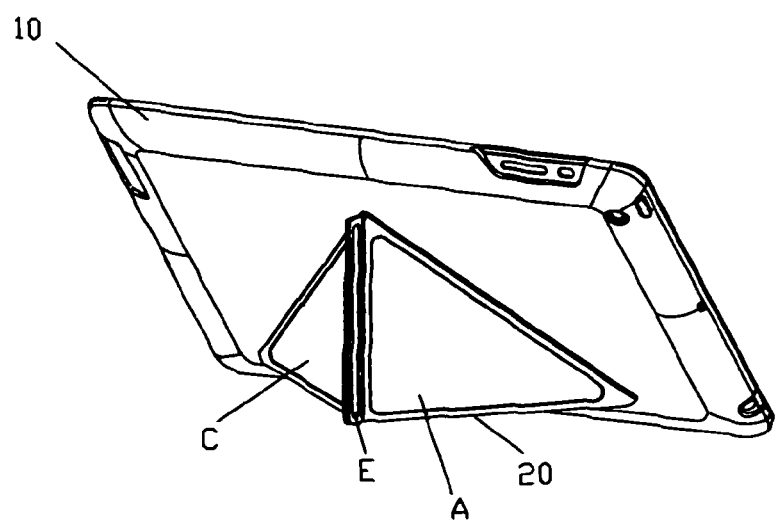
FIG. 3 shows the application of the first embodiment of the present invention.

FIG. 3 shows the folding way of the present invention, in that the two triangles A and C are folded backwards and the two oblongs D an E are overlapped to one another so that the lower casing 10 is formed as a steady seat for supporting an electronic device thereon.

Figure 4:
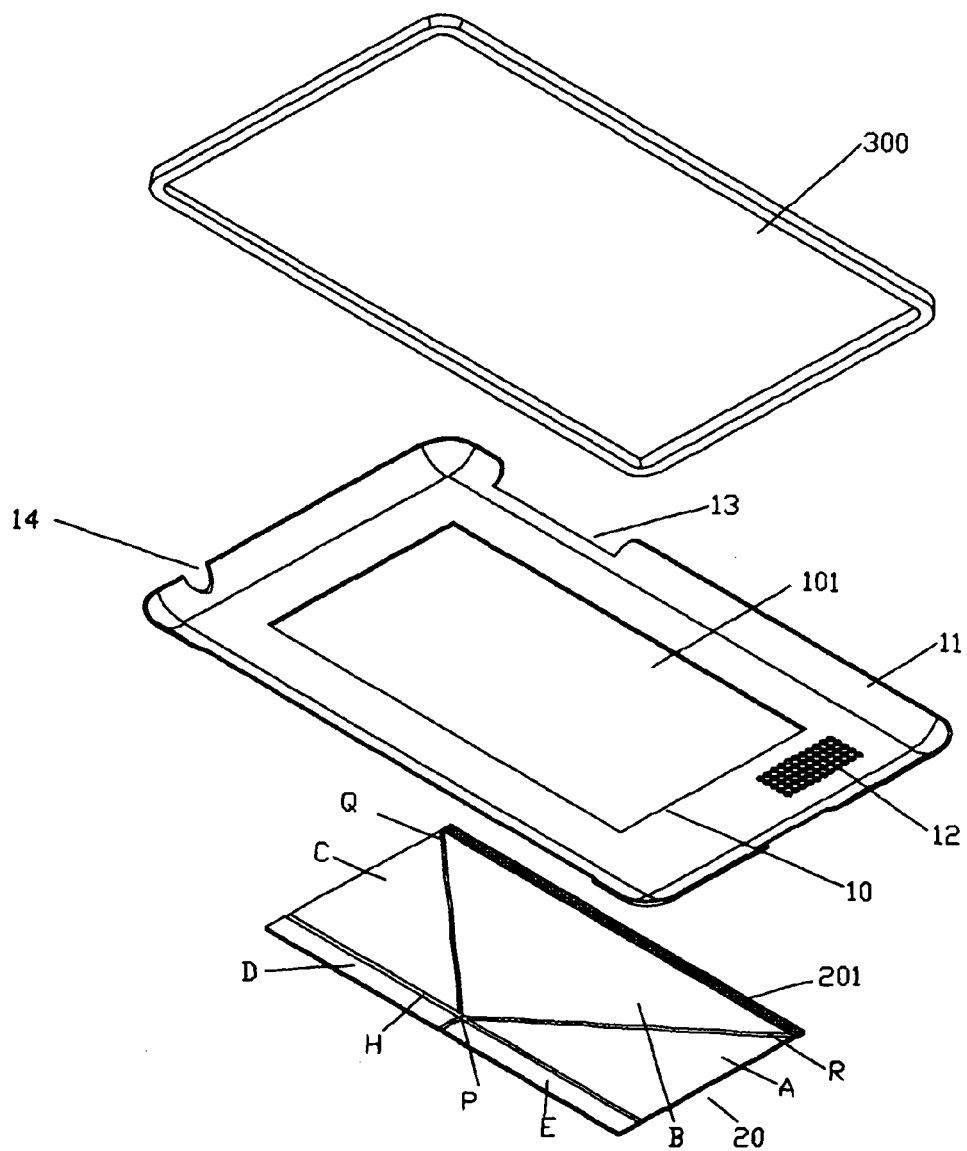
FIG. 4 is a perspective view of a second embodiment of the present invention.
Figure 5:
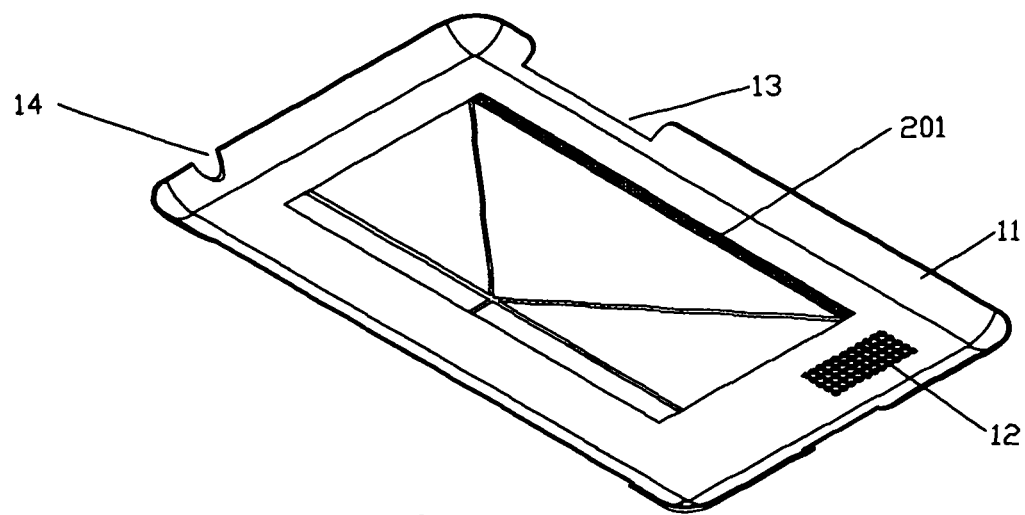
FIG. 5 is a schematic view about the combination of the lower casing and the supporting sheet.
Figure 6:
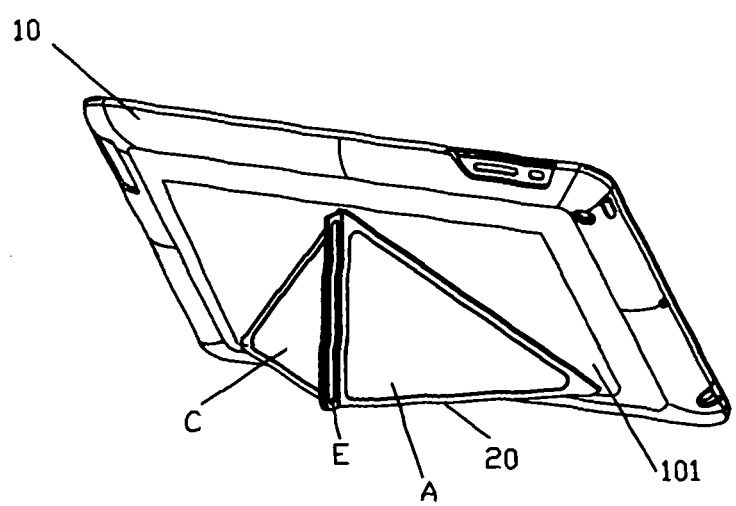
FIG. 6 shows the application of the second embodiment of the present invention.

Referring to FIGS. 4 to 6, the second embodiment of the present invention is illustrated. The structure of the second embodiment is almost identical to that of the first embodiment. Thus those elements of the second embodiment like to those in the first embodiment are identified by the same numerals and the details thereof will not be further described herein. Only those differences are described.

In the second embodiment, the lower casing 10 is formed with a hollow hole 101 in a middle portion thereof for receiving the supporting sheet 20.

Figure 7:
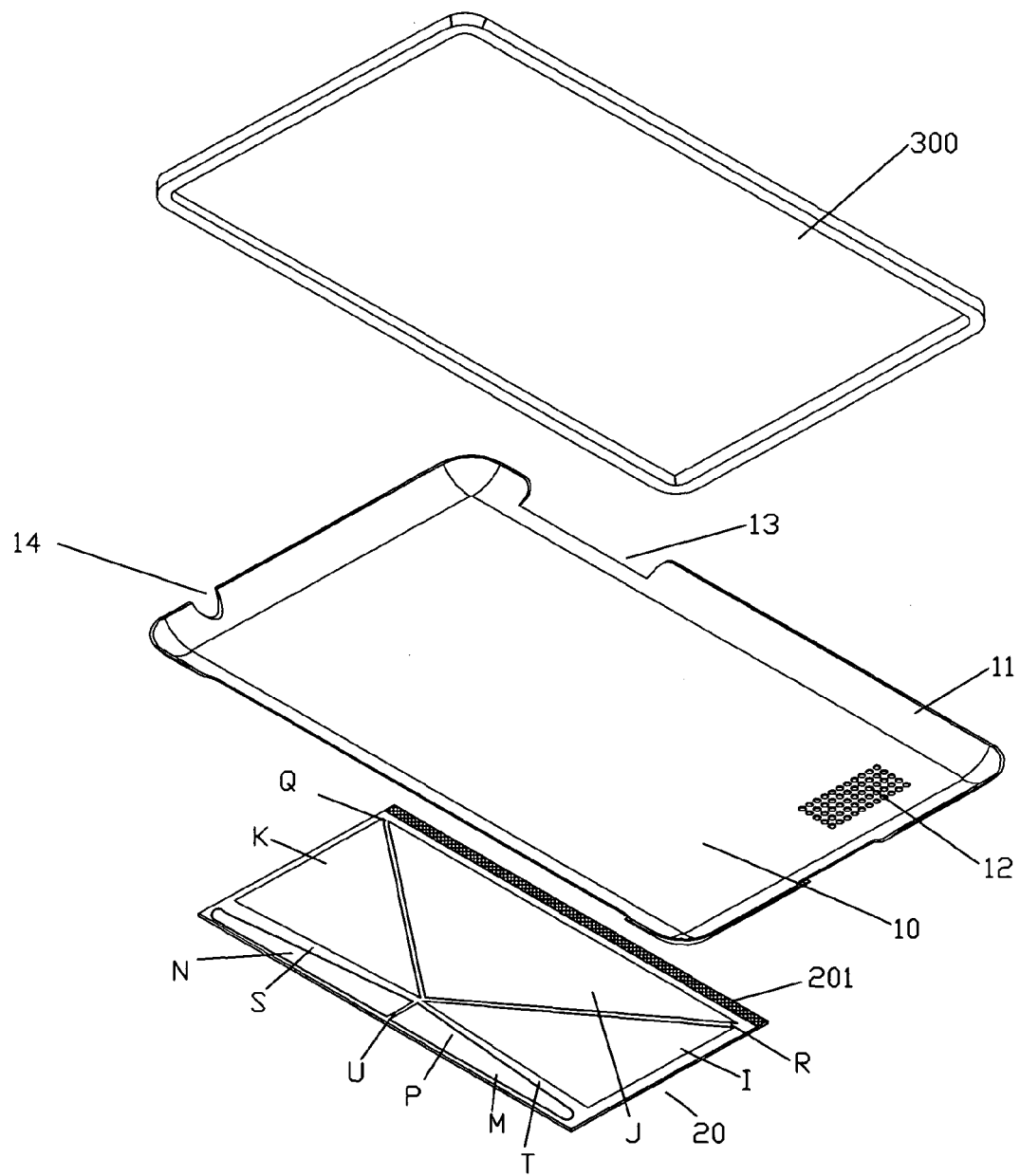
FIG. 7 is a perspective view of a third embodiment of the present invention.
Figure 8:
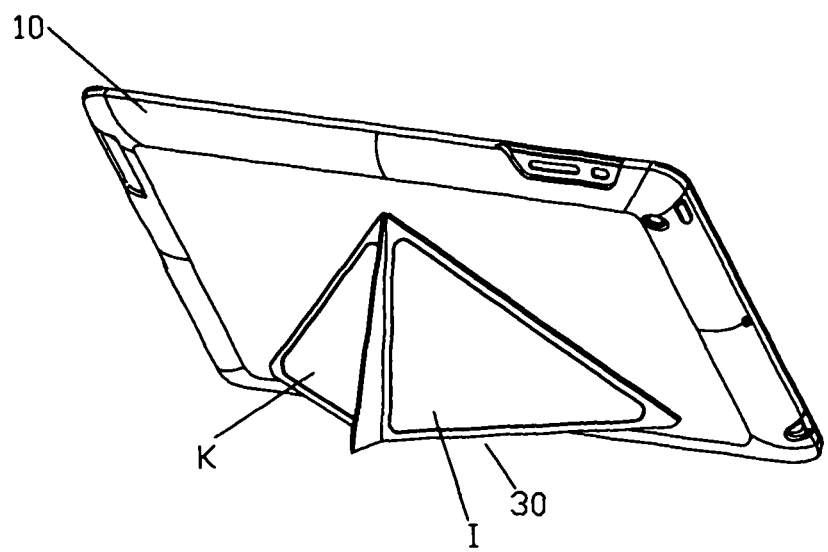
FIG. 8 shows the application of the third embodiment of the present invention.
Figure 9:
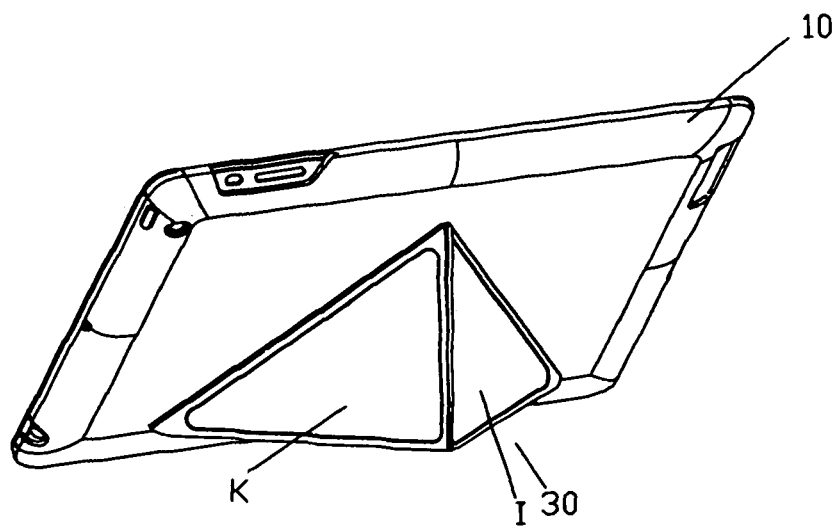
FIG. 9 shows another application of the third embodiment of the present invention.

With reference to FIGS. 7 to 9, the third embodiment of the present invention is illustrated. The structure of the third embodiment is almost identical to that of the second embodiment. Thus those elements of the third embodiment like to those in the first embodiment are identified by the same numerals. The element of the third embodiment will be described herein.

A lower casing 10 has an approximately rectangular shape as illustrated in FIG. 7. A periphery of the lower casing 10 is formed with a frame 11 for enclosing a tablet computer completely so as to isolate damages from external sources, powders, evaporations, and damage from collision. The lower casing 10 are formed with a plurality of holes, one hole 14 serves for exposing a USB slot, one hole 12 for sound transmission, and other holes 13 for heat dissipation and other functions.

A supporting sheet 20 includes at least one kind of foldable traces. The supporting sheet 20 is foldable along the foldable traces so as to present a three dimensional structure.

A combining band 201 is formed at an upper side of the supporting sheet 20 for adhering the supporting sheet 20 to the lower casing 10.

For the folding traces as illustrated in FIG. 7, a point P is located near a lower side of the supporting sheet 20. Four foldable lines Q, R, S and T extend from the point P to the four corners of the supporting sheet 20 so as to divide the upper portion of the supporting sheet 20 into three triangular sections I, J and K. Another foldable lines U extend downwards from the point P to the lower side of the supporting sheet 20 so as to divide the lower portion of the supporting sheet 20 into two triangular sections M and N. These sections are connected flexibly so that the adjacent sections are foldable with respective to one another.

FIG. 8 shows the way for folding the structure of the present invention. In that, the supporting sheet 20 is folded backwards so that the section J and K stands upwards, and the section I is as a bottom which is hidden in FIG. 8. The two triangular sections M and N move closer to overlap with each other to form as a three dimensional seat for supporting the lower casing 10. A tablet computer (not shown) can be placed upon the lower casing 10 to be supported therein.

FIG. 9 shows another way for folding the structure of the present invention. The folding way is like that in FIG. 8, but the triangular sections M and N are hidden with the space confined by the triangular sections J and K.

Figure 10:
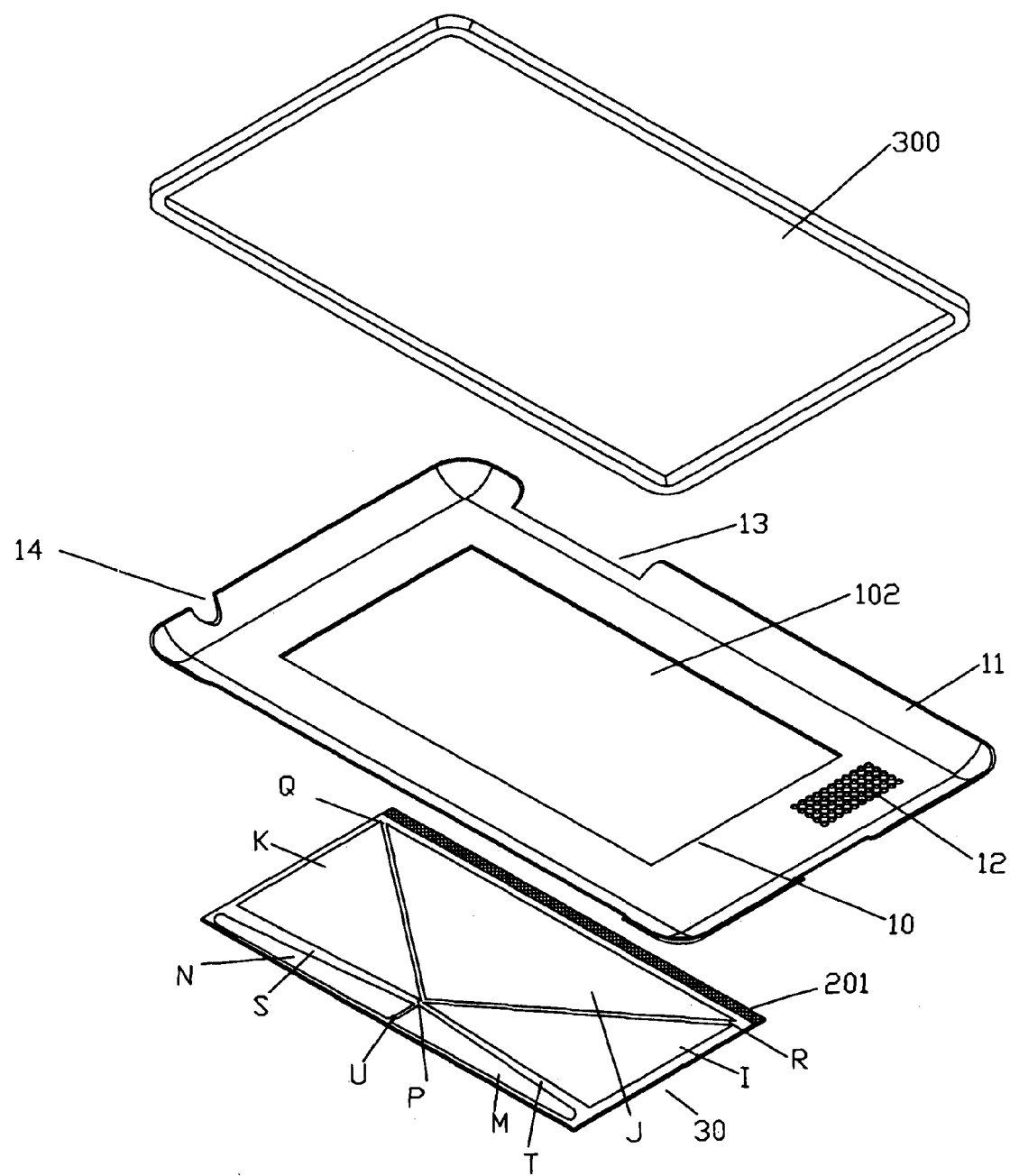
FIG. 10 is a perspective view of a fourth embodiment of the present invention.
Figure 11:
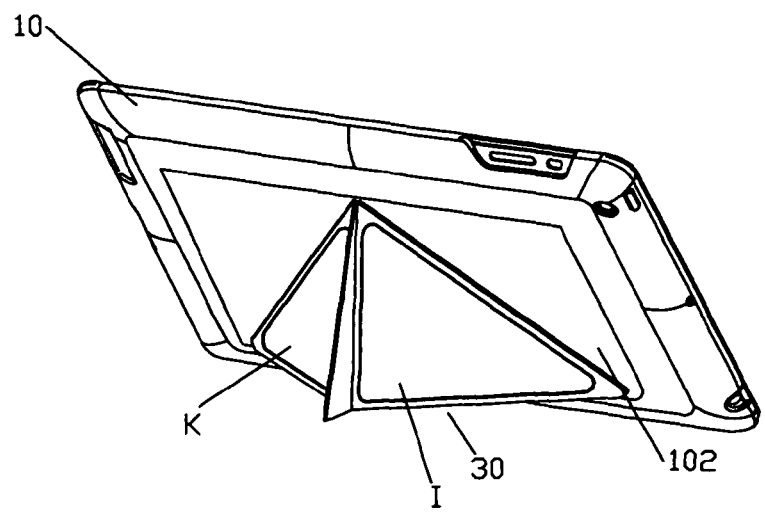
FIG. 11 shows the application of the fourth embodiment of the present invention.
Figure 12:
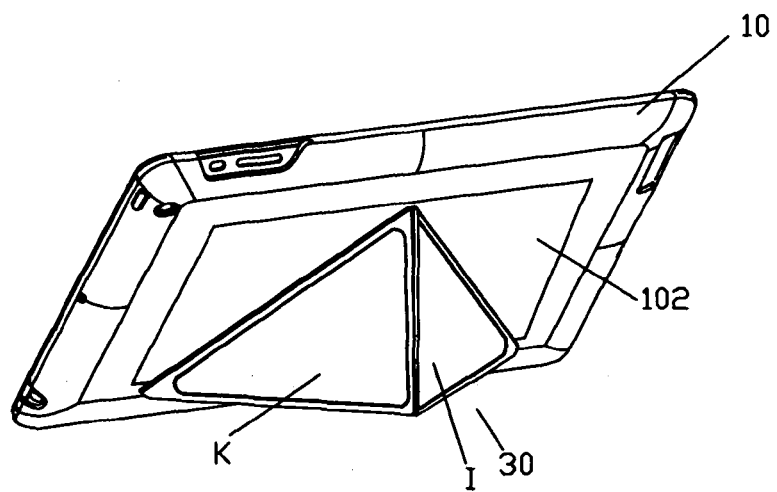
FIG. 12 shows another application of the fourth embodiment of the present invention.

Referring to FIGS. 10 to 12, the fourth embodiment of the present invention is illustrated. The structure of the fourth embodiment is almost identical to that of the third embodiment. Thus those elements of the fourth embodiment like to those in the third embodiment are identified by the same numerals and the details thereof will not be further described herein. Only those differences are described.

In the fourth embodiment, the lower casing 10 is formed with a hollow hole 101 in a middle portion thereof for receiving the supporting sheet 20.

Advantages of the present invention are that the present invention is not only used for supporting an electronic device, but also it can be used to support the devices in different orientation. Thus, the user is not necessary to prepare another supporter. Therefore, the functions of the casing for a flat electronic device are enhanced and the user will feel convenient as he (or she) carries the computer.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A protection casing of an electronic device with a function of supporting, comprising:

a lower casing (10) having an approximately rectangular shape; a periphery of the lower casing being formed with a frame for enclosing a tablet computer;

a supporting sheet (20) including at least one kind of foldable traces; the supporting sheet being foldable along the foldable traces so as to present a three dimensional structure;

a combining band (201) formed at an upper side of the supporting sheet adhering the supporting sheet to the lower casing; and wherein after assembly the supporting sheet to the lower casing, the supporting sheet can be folded along the foldable traces to form as a seat for standing the lower casing; and an electronic device can be placed on the lower casing for being supporting thereon; and wherein the foldable traces divide the supporting sheet into three triangular sections and two oblong sections, which are formed by locating a point (P) near a lower side of the supporting sheet (20); a foldable line (H) approximately parallel to the lower side of the supporting sheet (20) passing through the point (P); then two foldable lines (Q and R) extending from the point (P) to two upper corners of an upper side of the supporting sheet (20) so that to divide the supporting sheet (20) into three triangular sections (A, B and C); another foldable lines (S) extend downwards from the point (P) to the lower side of the supporting sheet (20) so as to divide the lower portion of the supporting sheet (20) into two oblong sections (D and E); and these sections being connected flexibly so that the adjacent sections are foldable with respective to one another.

2. The protection casing as claimed in claim 1, wherein the three triangular sections (A, B and C) include two approximately right triangles (A and C) clamping an approximately isosceles triangle (B); the longest sides of the approximately right triangles (A and C) are adjacent to the approximately isosceles triangle (B); and a bottom side of each right triangle (A and C) is adjacent to a corresponding oblong sections (D and E); the foldable traces between the different sections of the support plate (20) have weak structures so that they are folded to one another.

3. The protection casing as claimed in claim 1, wherein the electronic device is one of a tablet computer, computer displays, electronic game machines, and personal digital assistants.

4. The protection casing as claimed in claim 1, wherein the lower casing are formed with a plurality of holes, one hole serves for exposing a USB slot, one hole for sound transmission, and other holes for heat dissipation and other functions.

5. A protection casing of an electronic device with a function of supporting, comprising:
  a lower casing (10) having an approximately rectangular shape; a periphery of the lower casing being formed with a frame for enclosing a tablet computer;
  a supporting sheet (20) including at least one kind of foldable traces; the supporting sheet being foldable along the foldable traces so as to present a three dimensional structure;
  a combining band (201) formed at an upper side of the supporting sheet adhering the supporting sheet to the lower casing; and
  wherein after assembly the supporting sheet to the lower casing, the supporting sheet can be folded along the foldable traces to form as a seat for standing the lower casing; and an electronic device can be placed on the lower casing for being supporting thereon;
  wherein the lower casing (10) is formed with a hollow hole (101) in a middle portion thereof for receiving the supporting sheet (20);
  wherein the foldable traces divide the supporting sheet into three triangular sections and two oblong sections, which are formed by locating a point (P) near a lower side of the supporting sheet (20); a foldable line (H) approximately parallel to the lower side of the supporting sheet (20) passing through the point (P); then two foldable lines (Q and R) extending from the point (P) to two upper corners of an upper side of the supporting sheet (20) so that to divide the supporting sheet (20) into three triangular sections (A, B and C); another foldable lines (S) extend downwards from the point (P) to the lower side of the supporting sheet (20) so as to divide the lower portion of the supporting sheet (20) into two oblong sections (D and E); these sections being connected flexibly so that the adjacent sections are foldable with respective to one another.

6. The protection casing as claimed in claim 5, wherein the three triangular sections (A, B and C) include two approximately right triangles (A and C) clamping an approximately isosceles triangle (B); the longest sides of the approximately right triangles (A and C) are adjacent to the approximately isosceles triangle (B); and a bottom side of each right triangle (A and C) is adjacent to a corresponding oblong sections (D and E); the foldable traces between the different sections of the support plate (20) have weak structures so that they are folded to one another.

7. A protection casing of an electronic device with a function of supporting, comprising:
  a lower casing (10) having an approximately rectangular shape; a periphery of the lower casing being formed with a frame for enclosing a tablet computer;
  a supporting sheet (20) including at least one kind of foldable traces; the supporting sheet being foldable along the foldable traces so as to present a three dimensional structure;
  a combining band (201) formed at an upper side of the supporting sheet adhering the supporting sheet to the lower casing; and
  wherein after assembly the supporting sheet to the lower casing, the supporting sheet can be folded along the foldable traces to form as a seat for standing the lower casing; and an electronic device can be placed on the lower casing for being supporting thereon; and
  wherein the foldable traces divide the supporting sheet into five triangular sections, which are formed by locating a point (P) near a lower side of the supporting sheet (20); four foldable lines (Q, R, S and T) extending from the point (P) to the four corners of the supporting sheet (20) to divide the upper portion of the supporting sheet (20) into three triangular sections (I, J and K); another foldable lines (U) extend downwards from the point (P) to the lower side of the supporting sheet (20) so as to divide the lower portion of the supporting sheet (20) into two triangular sections (M and N); and these sections are connected flexibly so that the adjacent sections are foldable with respective to one another.

* * * * *